(12) United States Patent
Neal et al.

(10) Patent No.: US 10,890,333 B2
(45) Date of Patent: Jan. 12, 2021

(54) COOKING APPLIANCE COOLING FAN WITH OPTICAL SPEED SENSOR

(71) Applicant: Midea Group Co., Ltd., Foshan (CN)

(72) Inventors: Vern A. Neal, Louisville, KY (US); John Hooker, Louisville, KY (US); Daniel J. Trice, Louisville, KY (US)

(73) Assignee: MIDEA GROUP CO., LTD., Guangdong (CN)

(*) Notice: Subject to any disclaimer, the term of this patent is extended or adjusted under 35 U.S.C. 154(b) by 122 days.

(21) Appl. No.: 16/132,077

(22) Filed: Sep. 14, 2018

(65) Prior Publication Data

US 2020/0092958 A1 Mar. 19, 2020

(51) Int. Cl.
*F24C 15/00* (2006.01)
*H05B 6/66* (2006.01)
*G01P 3/36* (2006.01)

(52) U.S. Cl.
CPC .............. *F24C 15/006* (2013.01); *G01P 3/36* (2013.01); *H05B 6/666* (2013.01)

(58) Field of Classification Search
CPC .................................................... F24C 15/006
See application file for complete search history.

(56) References Cited

U.S. PATENT DOCUMENTS

| | | | |
|---|---|---|---|
| 4,047,106 A | 9/1977 | Robinson | |
| 5,744,921 A | 4/1998 | Makaran | |
| 5,799,498 A * | 9/1998 | Park | F25D 21/02 62/154 |
| 6,087,654 A | 7/2000 | Durham, III | |
| 6,761,159 B1 * | 7/2004 | Barnes | F24C 15/2007 126/21 R |
| 6,772,752 B1 | 8/2004 | Boyer | |
| 8,101,890 B2 | 1/2012 | Wiseman et al. | |
| 8,158,912 B2 | 4/2012 | Armstrong et al. | |
| 8,241,434 B2 | 8/2012 | Walkden | |
| 8,844,433 B2 | 9/2014 | Bach | |
| 8,924,163 B2 | 12/2014 | Hudson et al. | |
| 9,080,776 B2 | 7/2015 | Armstrong et al. | |
| 9,447,977 B2 | 9/2016 | Gillespie | |
| 2008/0124667 A1 | 5/2008 | Schultz | |

(Continued)

FOREIGN PATENT DOCUMENTS

| | | |
|---|---|---|
| CN | 2812175 Y | 8/2006 |
| CN | 204617873 U | 9/2015 |

(Continued)

OTHER PUBLICATIONS

International Search Report and Written Opinion issued in Application No. PCT/CN2018/124348 dated Jun. 17, 2019.

(Continued)

*Primary Examiner* — David J Laux
(74) *Attorney, Agent, or Firm* — Middleton Reutlinger

(57) ABSTRACT

An optical sensor is used in a cooling system of a cooking appliance to sense rotation of the cooling fan. For example, in one aspect a cooking appliance is disclosed as including a housing with a cooking enclosure and cooling passage for venting heat generated within the cooking enclosure; a cooling fan in fluid communication with the cooling passage in order to provide a directed airflow within the cooling passage; and an optical sensor to sense rotation of the cooling fan.

15 Claims, 8 Drawing Sheets

(56) References Cited

U.S. PATENT DOCUMENTS

| | | |
|---|---|---|
| 2008/0298784 A1 | 12/2008 | Kastner |
| 2011/0214660 A1* | 9/2011 | Gillespie ............... F24C 15/006 |
| | | 126/21 A |
| 2013/0312731 A1 | 11/2013 | Zehr |
| 2015/0159822 A1 | 6/2015 | Mohr |
| 2015/0198465 A1 | 7/2015 | Holmes et al. |

FOREIGN PATENT DOCUMENTS

| | | |
|---|---|---|
| CN | 205433274 U | 8/2016 |
| CN | 205858758 U | 1/2017 |
| CN | 207091482 U | 3/2018 |
| CN | 207354086 U | 5/2018 |
| EP | 0330321 A2 | 8/1989 |
| EP | 0672831 B1 | 5/2003 |
| JP | H0622584 A | 1/1994 |

OTHER PUBLICATIONS

Avago Technologies. "Motion Control Encoders in Electrical Motor Systems." www.avagotech.com. Nov. 29, 2007.

Electro-Sensors. "Pulser Discs." www.electro-sensors.com. Apr. 6, 2018.

Ligard, Terry. "Rotational Speed Characteristics of DC Motors." www.brighthubengineering.com. Feb. 22, 2010.

\* cited by examiner

COOKING APPLIANCE COOLING FAN WITH OPTICAL SPEED SENSOR

BACKGROUND

Cooking appliances, particularly ranges or in-wall ovens, utilize a cooling fan to draw cool air through the product. This air is used to cool various heat-sensitive components of the oven, such as, for example, electrical components of a control panel. In such appliances, it is often desirable to monitor the functioning of the cooling fan in order to detect if the cooling fan is rotating, as otherwise the cooking appliance could overheat and potentially damage the appliance.

Conventionally, monitoring the cooling fan has been accomplished through use of Hall effect sensors, sail switches, or the like. Hall effect sensors include a strip of metal with a current applied. When in a magnetic field, electrons in this metal strip deflect to one edge of the strip, which results in a voltage gradient in the voltage across the width of the strip (e.g. perpendicular to the current). This may be used to determine a speed at which the cooling fan is operating. A sail switch is a mechanical (on/off) switch that acts in response to the flow of air from the cooling fan. These conventional methods have certain disadvantages, for example, they may require several additional steps in order to turn the cooking appliance off.

SUMMARY

The herein-described embodiments address these and other problems associated with the art by utilizing an optical sensor associated with a cooling fan in an appliance in order to monitor the speed of the cooling fan.

Therefore, consistent with one aspect of the invention, a cooking appliance is disclosed and includes: a housing including a cooking enclosure and a cooling passage for venting heat generated within the cooking enclosure; a cooling fan in fluid communication with the cooling passage to provide a directed airflow within the cooling passage; and an optical sensor positioned to sense rotation of the cooling fan.

In some embodiments, the cooking appliance additionally includes a heating element configured to generate heat within the cooking enclosure; and a controller coupled to the heating element and the cooling fan, the controller configured to control the heating element to generate heat within the cooking enclosure and to control the cooling fan to vent heat generated within the cooking enclosure; where the controller is further configured to selectively disable the heating element in response to the optical sensor sensing a lack of rotation of the cooling fan.

In some embodiments, the controller is further configured to monitor a speed of the cooling fan based on the signal generated in response to the optical sensor.

In some embodiments, the cooling fan includes a rotating member, where the optical sensor includes an optical transmitter element configured to generate an optical signal and an optical receiver element configured to receive the optical signal, and where the rotating member is interposed within an optical path between the optical transmitter element and the optical receiver element such that the optical receiver element generates an electrical signal that varies responsive to rotation of the rotating member. In some embodiments, the cooling fan includes a motor having a rotating motor shaft, where the rotating member is a sensor disc configured to rotate with the motor shaft.

In some embodiments, the sensor disc includes a plurality of circumferentially-arranged portions having varying optical characteristics. In other embodiments, the circumferentially-arranged portions vary in reflectiveness. In still other embodiments, the circumferentially-arranged portions vary in opacity. In still yet other embodiments, at least a portion of the circumferentially-arranged portions are voids in a surface of the sensor disc.

In some embodiments, the rotating member is not a separate device but consists of the fan blades which are generating the air flow.

In some embodiments, the optical transmitter element and the optical receiver element are arranged on opposite sides of the rotating member. In other embodiments, the optical transmitter element and the optical receiver element are arranged on a same side of the rotating member such that the optical receiver element senses a reflection of the optical signal generated by the optical transmitter element.

In some embodiments, the optical sensor further includes a circuit board disposed adjacent to a motor shaft of the cooling fan. In other embodiments, the cooking appliance additionally includes a control panel, where the directed airflow within the cooling passage is across the control panel to cool the control panel.

In another aspect, a method of cooling a cooling passage of a cooking appliance, the cooking appliance including a heating element, a cooling fan, an optical sensor and a controller coupled to the heating element and the cooling fan is disclosed herein. The method including: providing, by a cooling fan, a directed airflow within the cooling passage; sensing, by the optical sensor, a rotation of the cooling fan; and selectively disabling, by the controller, the heating element in response to the optical sensor sensing a lack of rotation of the cooling fan.

In some embodiments, providing the directed airflow within the cooling passage includes directing the airflow across a control panel.

In some embodiments, the optical sensor further includes an optical transmitter element and an optical receiving element, where a rotating member is interposed within an optical path between the optical transmitter element and the optical receiver element, the sensing by the optical sensor further including: generating, by the optical transmitter element, an optical signal, where the signal varies responsive to rotation of the rotating member; and receiving, by the optical receiver element, the optical signal. In other embodiments, the method additionally includes determining a speed of the cooling fan using the optical signal.

In yet another aspect, a cooling system for use in a cooking appliance of a type including a cooking enclosure and a cooling passage for venting heat generated within the cooking enclosure is disclosed herein. The cooling system including: a cooling fan in fluid communication with the cooling passage to provide a directed airflow within the cooling passage; and an optical sensor positioned to sense rotation of the cooling fan.

In some embodiments, the cooling fan includes a rotating member, where the optical sensor includes an optical transmitter element configured to generate an optical signal and an optical receiver element configured to receive the optical signal, and where the rotating member is interposed within an optical path between the optical transmitter element and the optical receiver element such that the optical receiver element generates an electrical signal that varies responsive to rotation of the rotating member.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIG. 7A illustrates an optical sensor where a transmitter element and a receiver element are on opposing sides of the sensor. FIG. 7B illustrates an optical sensor where a transmitter element and a receiver element are on the same side of the sensor.

DETAILED DESCRIPTION

Embodiments consistent with the invention may use an optical sensor to sense functioning of a cooling fan that is used to cool a cooling passage of a cooking appliance. A cooking appliance, in this regard, may be considered to include any number of different types of appliances capable of cooking food, including, for example, wall ovens, ranges, etc.

As used herein, a cooling passage may be any channel or other open area within a housing of a cooking appliance through which air may be conveyed in order to remove heat generated within the housing (e.g., by one or more heating elements used to supply cooking energy in the appliance). In some instances, a fan, referred to herein as a cooling fan, may be disposed within or otherwise in fluid communication with the cooling passage so that air may be moved through the cooling passage in a desired direction (e.g. across a control panel adjacent to the cooling passage).

As noted above, an optical sensor may be used in the illustrated embodiments to sense functioning of such a cooling fan during operation of the cooking appliance. An optical sensor, in this regard, may be considered to be any type of sensor capable of sensing light or other electromagnetic radiation (e.g., infrared or ultraviolet radiation) and converting that electromagnetic radiation into an electronic signal. An optical sensor, as used herein, may in some embodiments include an optical transmitter element that may generate an optical signal and an optical receiver element that may receive the generated optical signal, with the optical transmitter element and the optical receiver element positioned relative to one another to create a straight or reflected optical path between them such that the optical receiver element is capable of sensing the optical signal generated by the optical transmitter element. In other embodiments, an optical sensor may include only an optical receiver element, with the optical signal sensed by the optical receiver element generated externally from the optical sensor (or even based upon ambient radiation).

Numerous additional variations and modifications will be apparent to one of ordinary skill in the art, as will become apparent from the description below. Therefore, the invention is not limited to the specific implementations discussed herein.

Figure 1:
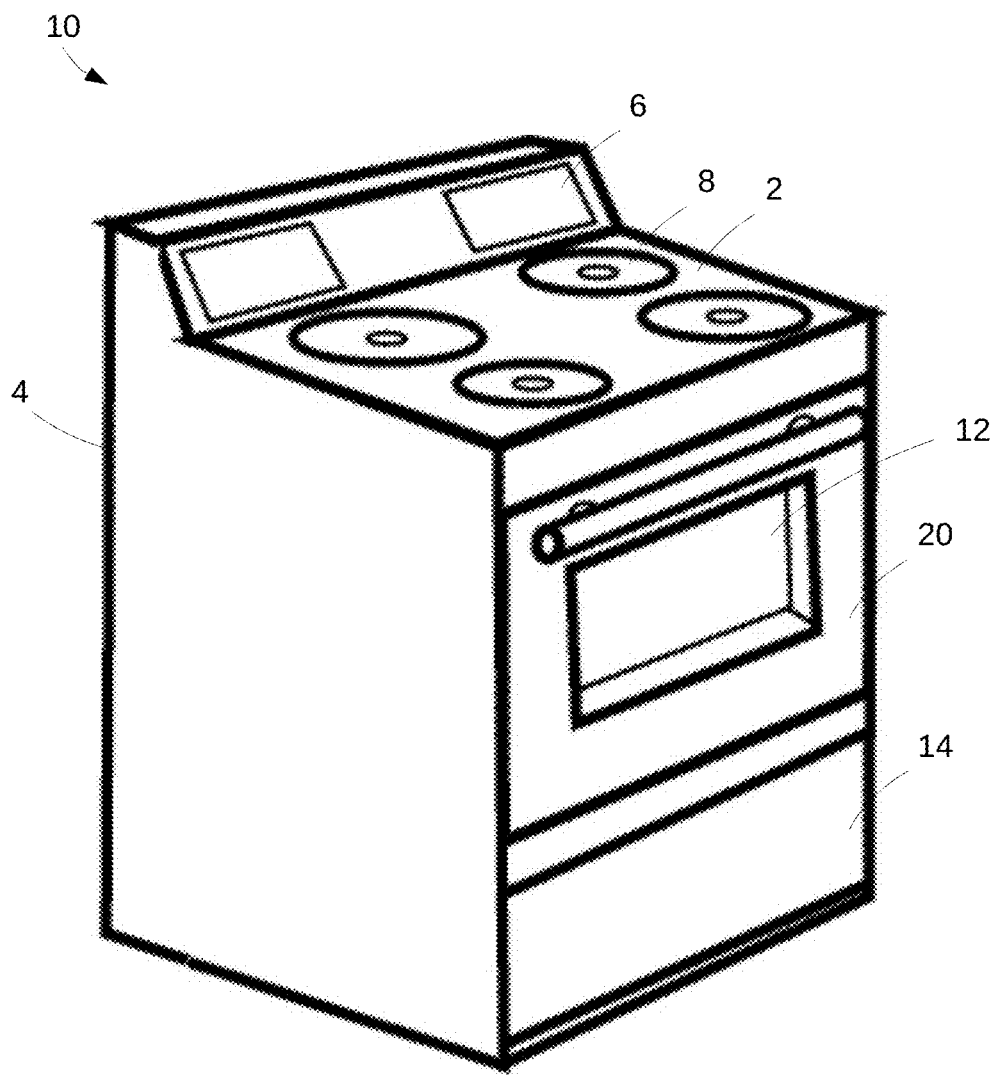
FIG. 1 is a perspective view of a cooking appliance consistent with some embodiments of the invention.

Turning now to the drawings, wherein like numbers denote like parts throughout the several views, FIG. 1 illustrates an example cooking appliance 10 in which the various technologies and techniques described herein may be implemented. Cooking appliance 10 is a residential-type range, and as such includes access one or more cooking enclosures 12 or portion thereof within the cooking appliance 10. A door 20 defines at least a portion of an opening into the cooking enclosure 12. The door 20 is typically on a front side of the cooking appliance 10 and may be positioned above an optional baking, warming, or storage drawer 14, if present. Although illustrated as including a single door 20 and a single cooking enclosure 12, it is to be understood that the cooking appliance may include more than one cooking compartment and/or more than one opening (e.g. double oven).

In some implementations, the cooking appliance 10 may include a cooktop 2 on a top of a housing 4. The cooking appliance 10 may further include a control panel 6 having a plurality of user-actuated controls for controlling various heating elements in the appliance, including those power by both gas and electric, e.g., the gas and/or electric burners 8, if a cooktop is present, and/or one or more gas or electric heating elements in cooking enclosure 12. It should be understood that the one or more cooking enclosures 12 and/or burners 8 may be heated by gas, electric, hybrid of gas and electric, or combination of heat sources thereof. In other embodiments, the cooking appliance may not include a cooktop 2, as it may be inserted into an opening in a wall (e.g. a wall oven). The cooking appliance may contain within it (not illustrated in FIG. 1) one or more heating elements that are capable of generating heat within the cooking enclosure 12.

As noted above, cooking appliance 10 is an example of a residential cooking appliance such as the type that may be used in single-family or multi-family dwellings, or in other similar applications. However, it will be appreciated that the herein-described techniques may also be used in connection with other types of cooking appliances in some embodiments. For example, the herein-described techniques may be used in commercial applications in some embodiments. Moreover, the herein-described techniques may be used in connection with various cooking appliance configurations.

Figure 2:
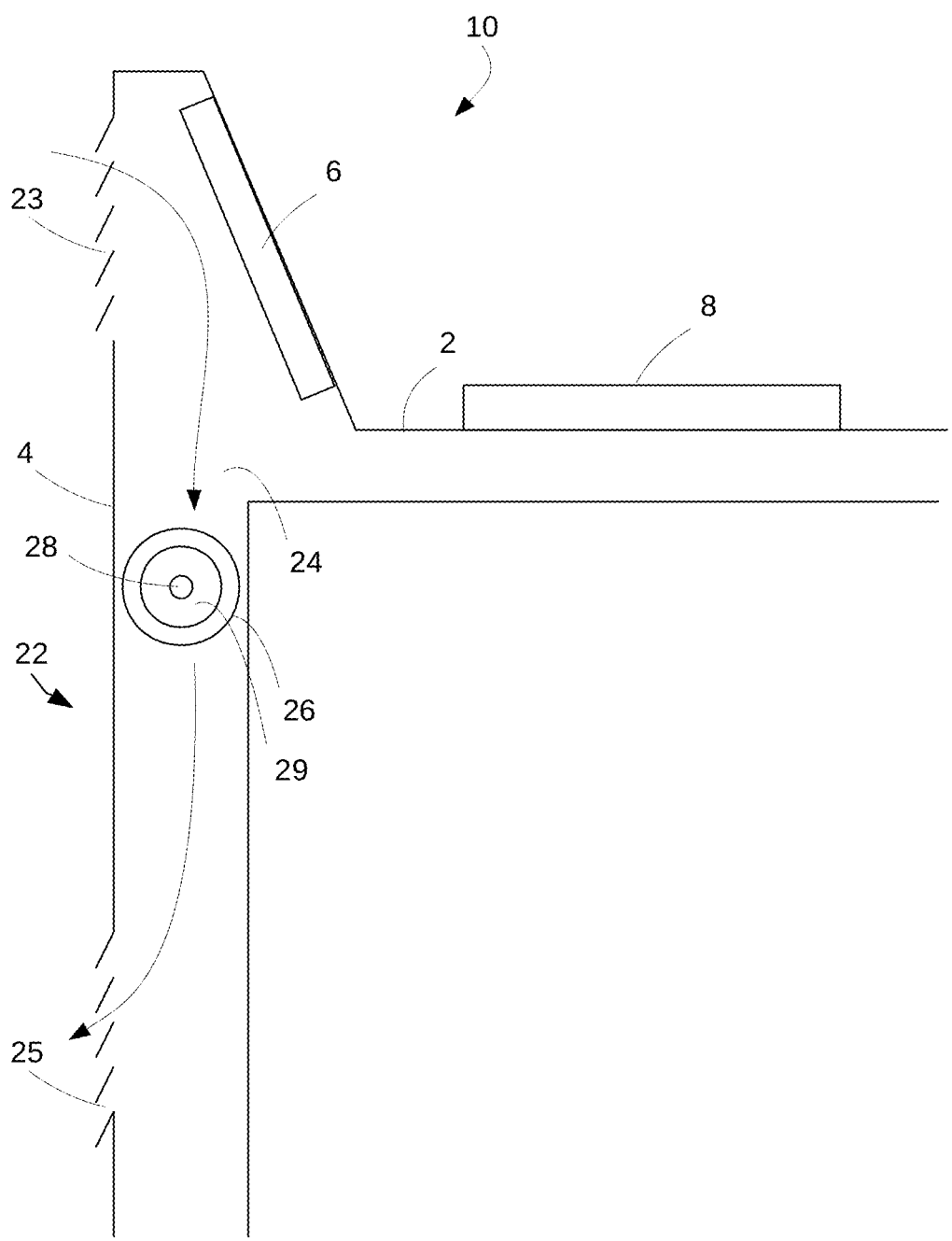
FIG. 2 is a side view of an interior portion of the cooking appliance of FIG. 1.

Now turning to FIG. 2, which illustrates a side view of a portion of the interior of the housing 4, the cooking appliance 10 may include a cooling system 22 for venting heat generated within the cooking enclosure 12. The cooling system 22 includes a cooling passage 24 through which air may pass through between an air inlet 23 and an air outlet 25. The cooling system 22 may further include a cooling fan 26 that is in fluid communication with the cooling passage 24; the cooling fan 22 may direct airflow through the cooling passage, over the internal electrical components of the control panel 6, and through the air outlet 25. Directing airflow in this manner may assist in preventing the electrical components of the control panel 6 from overheating. As will be discussed in greater detail herein, the cooling fan 26 may include a motor (not illustrated) having a rotating motor shaft 28, a rotating member, and an optical sensor 29 positioned in order to sense the rotation of the cooling fan. In some embodiments, such as illustrated in FIG. 2, the rotating member is a set of fan blades and the optical sensor 29 detects the rotational movement of the fan blades. In other embodiments, the rotating member may be a sensor disc that is configured to rotate with the motor shaft (see FIGS. 4-6). During operation of the cooking appliance 10, the optical sensor 29 detects the rotation, or lack thereof, of the cooling fan 26 and provides this information to a controller (described in detail with reference to FIG. 3). It is to be understood that FIG. 2 is illustrative and that the electronic controls, fan, and/or cooling passage may vary in position within the system depending on the configuration of the appliance.

Figure 3:
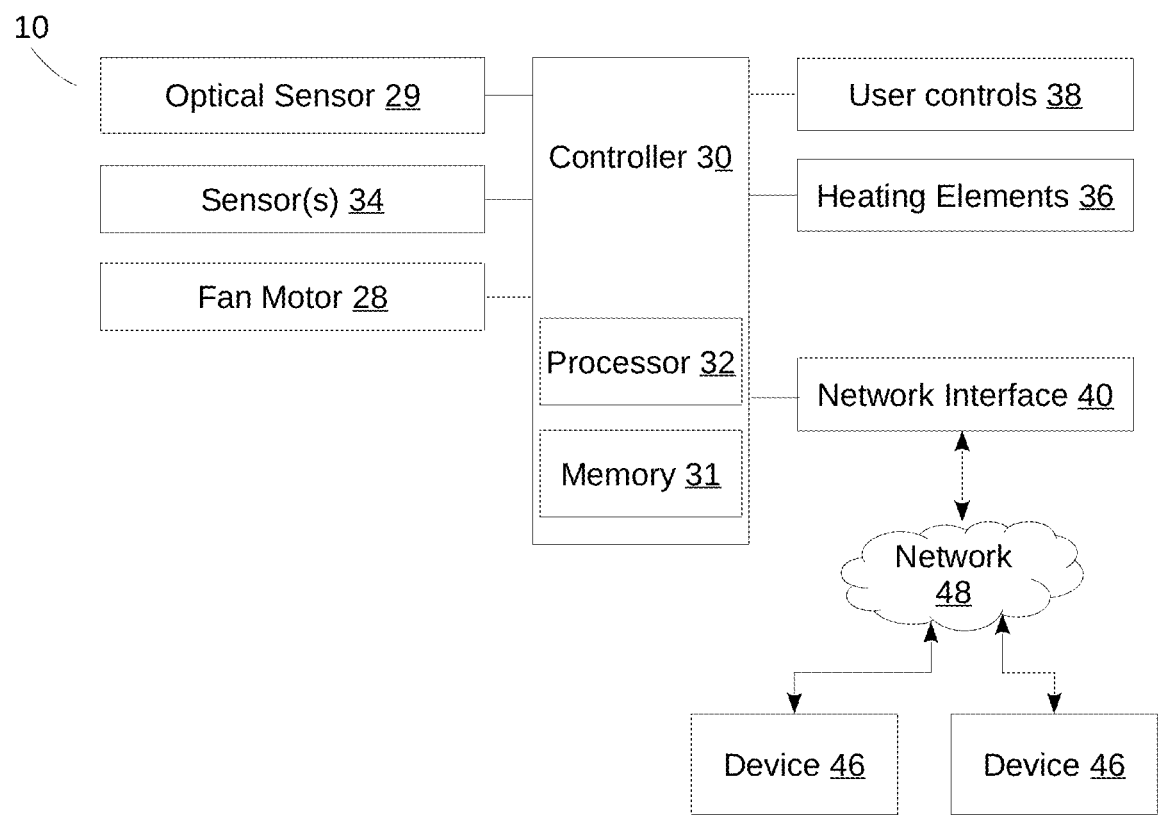
FIG. 3 is a block diagram of an example control system for the cooking appliance of FIG. 1.

Now turning to FIG. 3, cooking appliance 10 may include and be under the control of a controller 30 that receives inputs from a number of components and drives a number of components in response thereto. Controller 30 may, for example, include one or more processors 32 and a memory 31 within which may be stored program code for execution by the one or more processors. The memory may be embedded in controller 30, but may also be considered to include volatile and/or non-volatile memories, cache memories, flash memories, programmable read-only memories, read-only memories, etc., as well as memory storage physically located elsewhere from controller 30, e.g., in a mass storage device or on a remote computer interfaced with controller 30.

As shown in FIG. 3, controller 30 may be interfaced with various components, including the aforementioned optical sensor 29, cooling fan motor 28, one or more heating elements 36 (e.g., oven and/or burner heating elements), and other sensors (e.g., temperature, humidity, sensors related to each burner 8, etc., collectively represented at 34).

Moreover, controller 30 may be coupled to a control panel 6 with a plurality of user-actuated controls 38, including various input/output devices such as knobs, dials, sliders, switches, buttons, lights, textual and/or graphics displays, touch screen displays, speakers, image capture devices, microphones, etc. for receiving input from and communicating with a user. In addition, in some embodiments, controller 30 may also be coupled to one or more network interfaces 40, e.g., for interfacing with external devices 46 via wired and/or wireless networks such as Ethernet, Wi-Fi, Bluetooth, NFC, cellular and other suitable networks, collectively represented by network 48 in FIG. 3. Network 48 may incorporate in some embodiments a home automation network, and various communication protocols may be supported, including various types of home automation communication protocols. In other embodiments, other wireless protocols, e.g., Wi-Fi or Bluetooth, may be used.

Devices 46 may include, for example, various user devices such as computers, tablets, smart phones, wearable devices, etc., as well as various online services and devices, e.g., web or cloud services. Moreover, in some embodiments, at least a portion of controller 30 may be implemented externally from a cooking appliance, e.g., within a mobile device, a cloud computing environment, etc., such that at least a portion of the functionality described herein is implemented within the portion of the controller that is externally implemented. Further, in some embodiments, at least a portion of user controls 38 may be implemented on a device 46, e.g., where a mobile device or tablet is used to configure setting values for a cooking appliance and communicate those setting values to controller 30 for use during cooking.

In some embodiments, controller 30 may operate under the control of an operating system and may execute or otherwise rely upon various computer software applications, components, programs, objects, modules, data structures, etc. In addition, controller 30 may also incorporate hardware logic to implement some or all of the functionality disclosed herein. Further, in some embodiments, the sequences of operations performed by controller 30 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the cooking appliance illustrated in FIGS. 1-3 will be apparent to one of ordinary skill in the art, as will become apparent from the description below. Therefore, the invention is not limited to the specific implementations discussed herein.

Figure 4:
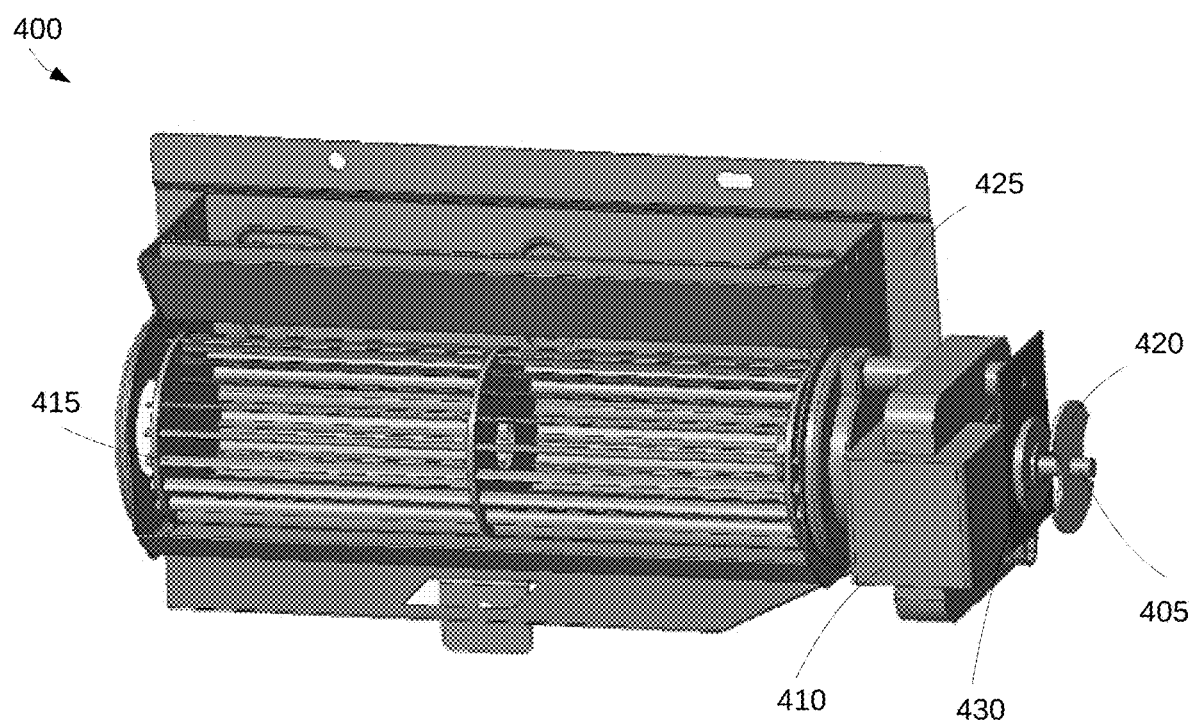
FIG. 4 is a front perspective view of a cooling fan consistent with some embodiments of the invention.
Figure 5:
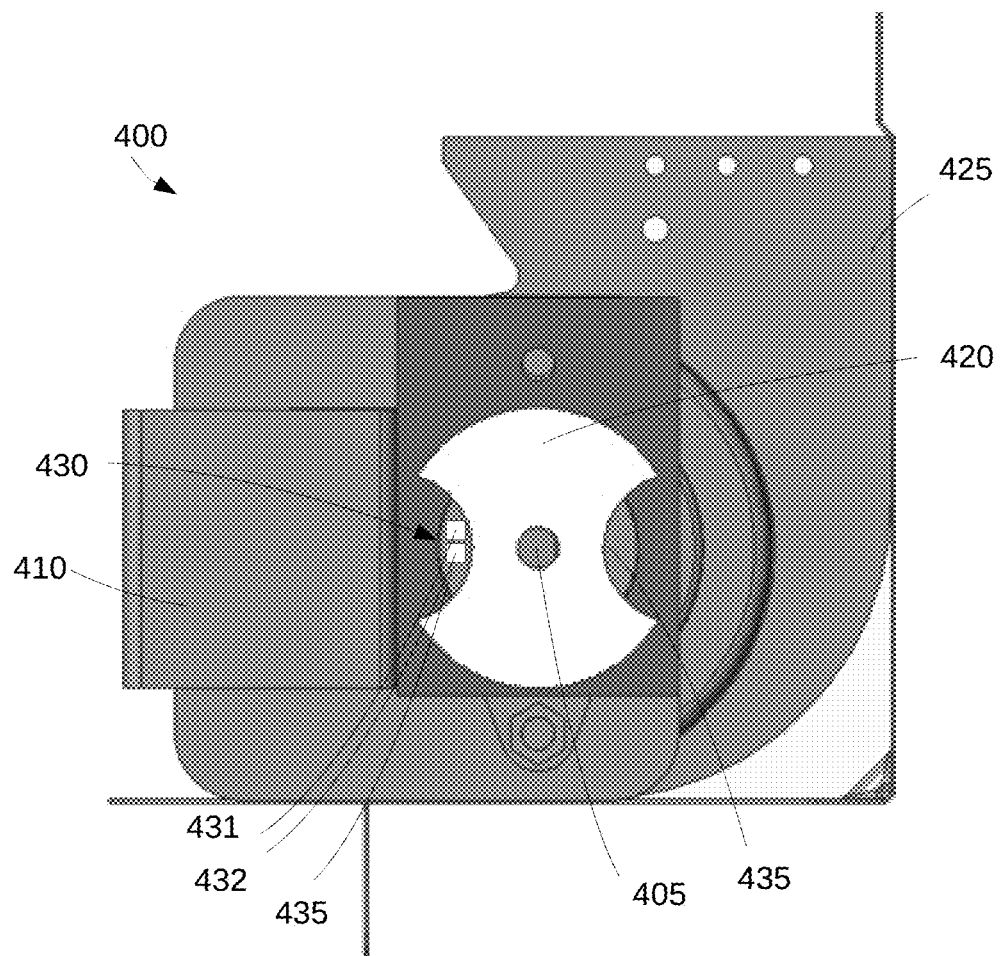
FIG. 5 is an end view of the cooling fan of FIG. 4.
Figure 6:
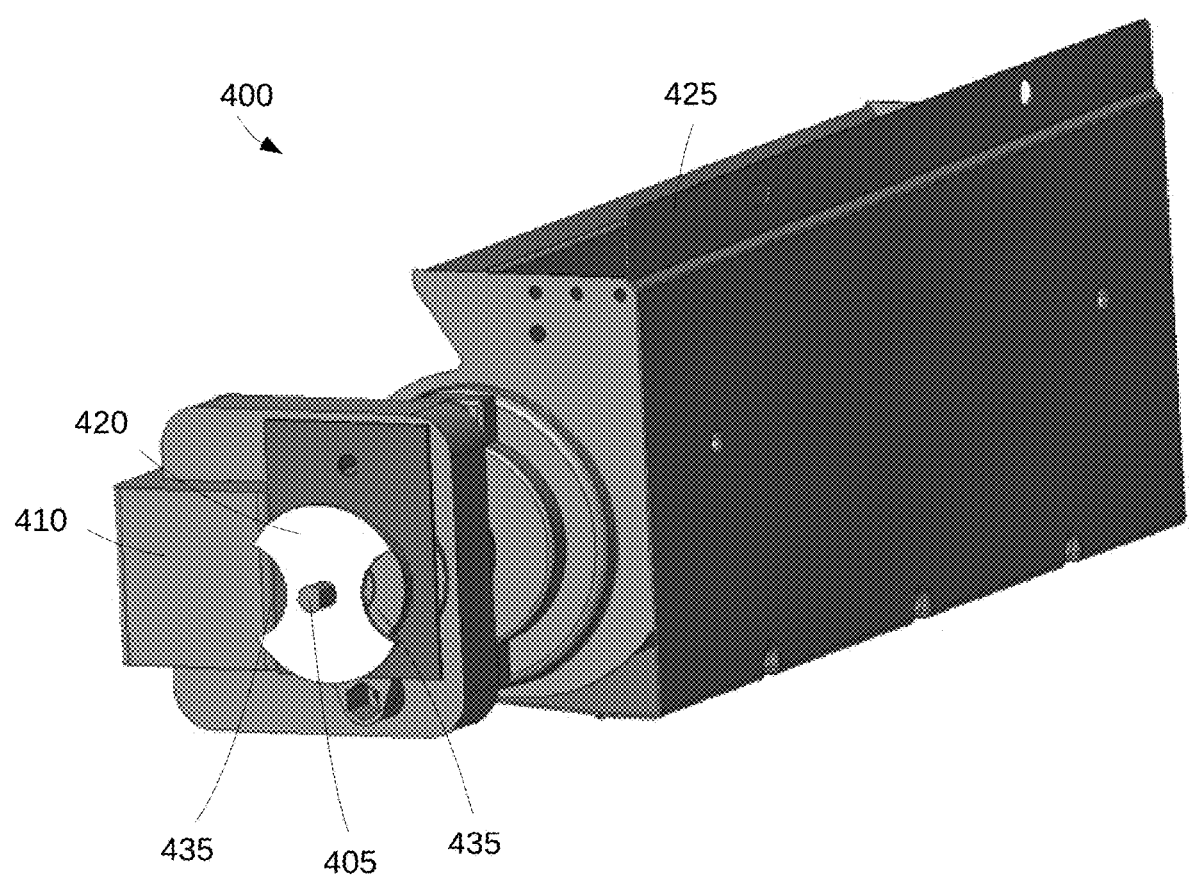
FIG. 6 is a partial rear perspective view of the cooling fan of FIG. 4.

Now turning to FIGS. 4-6, these figures illustrate an exemplary cooling fan 400 for use in a cooking apparatus, for example the cooking appliance 10 illustrated in FIGS. 1-3. The cooling fan 400 may include a rotating motor shaft 405 that couples a motor 410 with fan blades 415 of the cooling fan. In some embodiments, the cooling fan 400 may further include a rotating member in the form of a sensor disc 420, which may also be affixed to the rotating motor shaft 405; such that the sensor disc 420 rotates as the rotating motor shaft 405 rotates. In other embodiments, such as described with reference to FIG. 2, the rotating member of the cooling fan may be the fan blades themselves. In other instances, other rotating components of the cooling fan, which do not rotate when the cooling fan is not generating airflow, may be used as rotating members sensed by an optical sensor in other embodiments. The cooling fan 400, rotating motor shaft 405, motor 410, fan blades 415, and sensor disc 420 may collectively be mounted to a cooling fan housing 425. The cooling fan housing 425 may be attached to the housing of the cooking appliance so as to be disposed within a cooling passage (see reference number 24 in FIG. 2), thus allowing the cooling fan 400 to direct airflow through the cooling passage and over the internal electrical components of the control panel (see reference number 6 in FIG. 2), in order to facilitate the prevention of overheating.

During the operation of a cooking appliance, the cooling fan 400 may be monitored in order to determine if the cooling fan is operating properly and/or at what speed the cooling fan 400 is rotating. Where it is detected that the cooling fan 400 is not operating properly (e.g. where no rotation of the fan is sensed or where the speed of the fan is too slow) one or more of the heating elements of the cooking appliance may be turned off so that the cooking appliance does not overheat. This monitoring of the cooling fan 400 may be achieved through an optical sensor 430 positioned to detect the rotation of the cooling fan. As will be described in detail with respect to FIG. 8, a controller may monitor the speed of the cooling fan 400 based on the signal generated by the optical sensor 430.

Figure 7A:
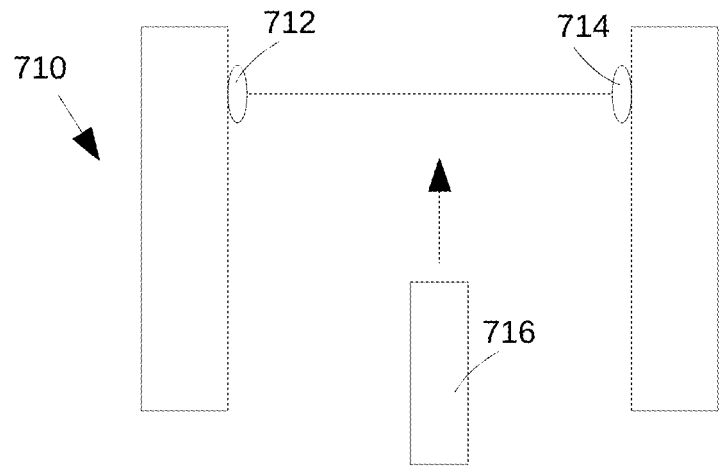
FIGS. 7A-B illustrate various configurations of components of an optical sensor consistent with some embodiments of the invention.
Figure 7B:
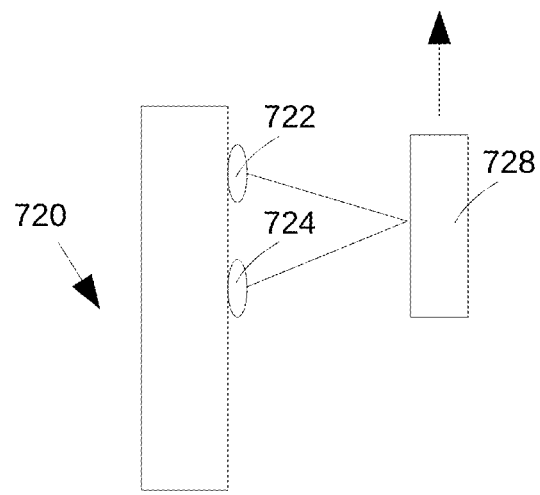

The positioning of the components of the optical sensor 430 may vary. With reference to FIG. 7A-B, various configurations of the components of the optical sensor 710, 720 are described and illustrated. For example, in some instances, the optical sensor may include an optical transmitter element that may generate an optical signal and an optical receiver element that may receive the generated optical signal. Referring now to FIG. 7A, the optical transmitter element 712 and the optical receiver element 714 are arranged on opposite sides of the sensor 710. In such an arrangement, the optical transmitter element 712 and the optical receiver element 714 may be positioned to create a straight optical path between them. When an object 716, for example one of the rotating members described previously, is interposed within this optical path, the light emitted by optical transmitter element 712 is blocked and thus not sensed by optical receiver element 714, whereby the electrical signal output by optical receiver element 714 varies because of the interference of the object 716. For example, where the object is a sensor disc, the electrical signal generated may be responsive to rotation of the disc. Referring now to FIG. 7B, the optical transmitter element 722 and the optical receiver element 724 are arranged on the same side of the sensor 720. In such an arrangement, the optical transmitter element 722 and the optical receiver element 724 are arranged along a reflected optical path such that the optical receiver element 724 senses light emitted by optical transmitter element 722 when a reflective object is positioned within the optical path. For example, a sensor disc 728 may include a reflective portion and a non-reflective portion (e.g. an aperture), such that when the non-reflective portion of the sensor disc is interposed within this optical path, light emitted by optical transmitter element 722 is not sensed by the optical receiver element 724. When the light emitted by the optical transmitter element 722 is not sensed the electrical signal output by optical receiver element 724 varies because of the interruption in the reflected optical path.

Returning now to FIGS. 4-6, the cooling fan may include an optical sensor 430 where a transmitter element 431 and a receiver element 432 are located on the same side of the rotating member in the form of the sensor disc 420, so that the receiver element senses a reflection of the signal generated by the transmitter, such as illustrated in FIG. 7B and FIGS. 4-6. In other embodiments, a cooling fan may include an optical sensor where a transmitter element and a receiver element are located on opposing sides of the rotating member in the form of a sensor disc, such as illustrated in FIG. 7A, whereby portions of the sensor disc interrupt a straight optical path between the transmitter and receiver elements. In either instance, the electrical signal output by the receiver element will vary with a frequency that varies with the rotational speed of the rotating member, and a signal that does not vary (e.g., that is at a constant voltage) will generally be indicative of a lack of rotation of the rotating member.

In some embodiments, the sensor disc 420 may be circular, or any convenient geometry, in shape, and various circumferentially arranged portions of the sensor disc 420 may have differing optical characteristics. In some instances, the varying optical characteristics include portions of the sensor disc 420 that differ in reflectiveness. For example, a first portion may include a region that is reflective, such that the optical signal generated by the optical transmitter element may be received by the optical receiver element; while other regions may be non-reflective. These non-reflective regions function as an object interfering with the optical path, resulting in a different electrical signal being generated. The sensor disc 420, affixed to the rotating motor shaft 405, rotates as the cooling fan 400 rotates. Therefore, the difference in electrical signal allows the optical sensor 430 to monitor the rotation of the cooling fan 400. For example, as the rotation of the cooling fan 400 slows, so does the time elapsed between each instance the optical sensor detects an interference of the object (e.g. the non-reflective region of the sensor disc 420).

Similarly, in other embodiments, the varying optical characteristics may include portions of the sensor disc 420 that include regions that differ in opacity. In still other embodiments, such as illustrated in FIGS. 4-6, the sensor disc 420 may include voids 435 in a surface of the sensor disc 420. These embodiments may function similarly to embodiments where the sensor disc 420 has regions varying in reflectiveness or opacity. As a non-limiting example, the sensor disc 420 may have a region that is completely translucent, or alternatively include a void 435; while the remainder of the sensor disc 420 may be a reflective surface. This translucent region or void 435 may function as an object interfering with the optical path, resulting in a different electrical signal being generated. As previously described, the sensor disc 420 rotates as the cooling fan 400 rotates; therefore, the difference in electrical signal allows the optical sensor 420 to monitor the rotation of the cooling fan 400.

Alternatively, in embodiments where the transmitter element and receiver element of the optical sensor are located on opposing sides of the rotating member, such as illustrated in FIG. 7A, a void or transparent or translucent portion may allow for an optical path between the transmitter element and receiver element, while the surface of the sensor disc may function as the interfering object.

Figure 8:
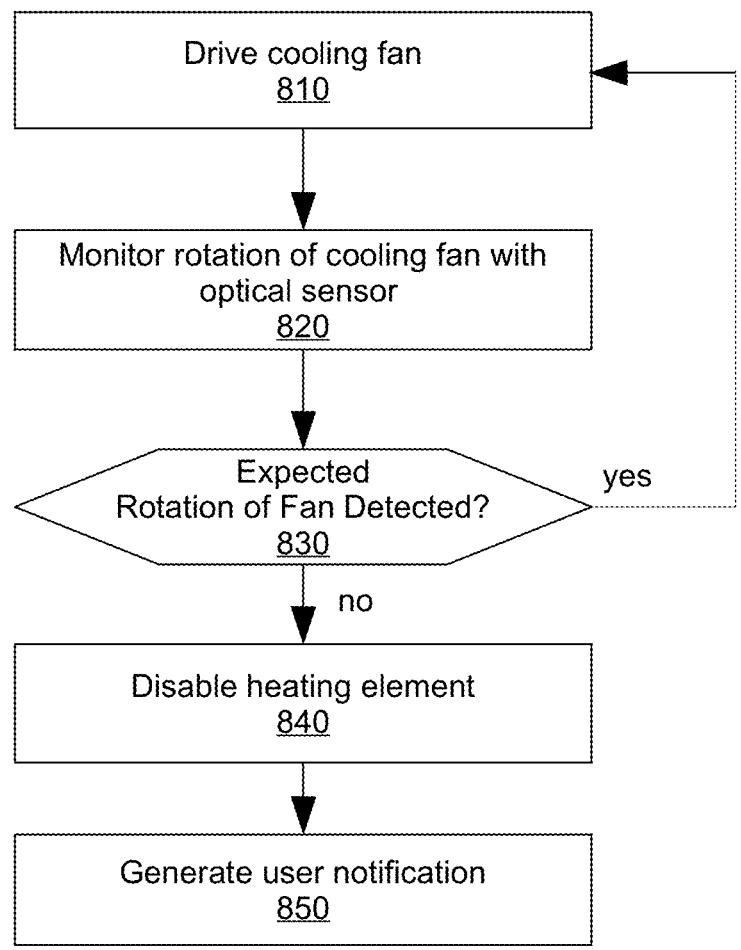
FIG. 8 is an example embodiment of an operational flow for a cooking appliance with a cooling fan with an optical sensor.

Now turning to FIG. 8, this figure illustrates an example embodiment of an operational flow 800 for a cooking appliance 10 with a cooling fan 26 with an optical sensor 29 for measuring the rotation of the cooling fan 26, such as illustrated in FIGS. 1-3 and described herein. In block 810, a cooling fan provides a directed airflow within a cooling passage. In some embodiments, this includes directing the airflow across a control panel in order to prevent the internal electronic components of the control panel from overheating.

At block 820, an optical sensor senses the rotation (or lack thereof) of the cooling fan. In some embodiments, the optical sensor may include an optical transmitter element and an optical receiving element, for example as described previously herein. A rotating member, for example a sensor disc, may be interposed within an optical path created between transmitter element and the receiver element. In such embodiments, the optical transmitter element may generate an optical signal; however, the optical signal sensed by the optical receiver element will vary based on the rotation of the rotating member, thereby allowing the rotation (and if desired, the speed) of the cooling fan.

At block 830, a determination is made regarding the rotation of the cooling fan. If the optical sensor senses that the cooling fan is rotating, then the process repeats and the optical sensor continues to sense the rotation of the cooling fan. If the optical sensor senses that the cooling fan is no longer rotating (or in some embodiments, that the rotational speed of the cooling fan is below a desired threshold or otherwise below an expected speed), then, at block 840 the controller may selectively disable one or more heating elements of the cooking appliance to prevent overheating (e.g., where the appliance is an oven, the controller may disable the oven heating elements). In some embodiments, where the rotational speed of the cooling fan is determined to be below a desired threshold the controller may adjust an amount of power provided to the cooling fan so as to achieve a desired rotational speed.

Optionally, at block 850, the controller may also alert a user of the cooling fan's rotational status (e.g. if the cooling fan has stopped rotating). For example, in some embodiments, such an alert may be in the form of the controller interfacing with a user device, such as a smart phone, wearable device, etc. In other embodiments, the alert may be in a light, error message, or other indicator on the control panel and/or an audible alert.

It will be appreciated that various additional modifications may be made to the embodiments discussed herein, and that a number of the concepts disclosed herein may be used in combination with one another or may be used separately. Other modifications will be apparent to those of ordinary skill in the art having the benefit of the instant disclosure. Therefore, the invention lies in the claims hereinafter appended.

What is claimed is:

1. A cooking appliance, comprising:
    a housing including a cooking enclosure and a cooling passage for venting heat generated within the cooking enclosure;
    a cooling fan in fluid communication with the cooling passage to provide a directed airflow within the cooling passage,
    wherein the cooling fan includes a motor having a rotating motor shaft and a sensor disc configured to rotate with the motor shaft,
    wherein the sensor disc includes a plurality of circumferentially-arranged portions on a surface of the sensor disc having varying optical characteristics; and
    an optical sensor positioned to sense rotation of the cooling fan by sensing the plurality of circumferentially-arranged portions on the surface of the sensor disc.

2. The cooking appliance of claim 1, further comprising:
    a heating element configured to generate heat within the cooking enclosure; and
    a controller coupled to the heating element and the cooling fan, the controller configured to control the heating element to generate heat within the cooking enclosure and to control the cooling fan to vent heat generated within the cooking enclosure;
    wherein the controller is further configured to selectively disable the heating element in response to the optical sensor sensing a lack of rotation of the cooling fan.

3. The cooking appliance of claim 2, wherein the controller is further configured to monitor a speed of the cooling fan based on the signal generated in response to the optical sensor.

4. The cooking appliance of claim 1, wherein the optical sensor includes an optical transmitter element configured to generate an optical signal and an optical receiver element configured to receive the optical signal, and wherein the sensor disc is interposed within an optical path between the optical transmitter element and the optical receiver element such that the optical receiver element generates an electrical signal that varies responsive to rotation of the sensor disc.

5. The cooking appliance of claim 4, wherein the rotating member includes a set of fan blades.

6. The cooking appliance of claim 4, wherein the optical transmitter element and the optical receiver element are arranged on opposite sides of the sensor disc.

7. The cooking appliance of claim 4, wherein the optical transmitter element and the optical receiver element are arranged on a same side of the sensor disc such that the optical receiver element senses a reflection of the optical signal generated by the optical transmitter element.

8. The cooking appliance of claim 1, wherein the optical sensor further includes a circuit board disposed adjacent to a motor shaft of the cooling fan.

9. The cooking appliance of claim 1 further comprising a control panel, wherein the directed airflow within the cooling passage is across the control panel to cool the control panel.

10. The cooking appliance of claim 1, wherein the a plurality of circumferentially-arranged portions includes a first portion that is a translucent surface and a second portion that is a reflective surface.

11. A method of cooling a cooling passage of a cooking appliance, the cooking appliance including a heating element, a cooling fan having a motor and rotating motor shaft, an optical sensor and a controller coupled to the heating element and the cooling fan, the method comprising:
    providing, by a cooling fan, a directed airflow within the cooling passage;
    sensing, by the optical sensor, a rotation of the cooling fan by sensing rotation of a sensor disc configured to rotate with the motor shaft and including a plurality of circumferentially-arranged portions on a surface of the sensor disc having varying optical characteristics; and
    selectively disabling, by the controller, the heating element in response to the optical sensor sensing a lack of rotation of the cooling fan.

12. The method of claim 11, providing the directed airflow within the cooling passage includes directing the airflow across a control panel.

13. The method of claim 11, wherein the optical sensor further includes an optical transmitter element and an optical receiving element, wherein the sensor disc is interposed within an optical path between the optical transmitter element and the optical receiver element, the sensing by the optical sensor further including:
    generating, by the optical transmitter element, an optical signal, wherein the signal varies responsive to rotation of the sensor disc; and
    receiving, by the optical receiver element, the optical signal.

14. The method of claim 13, further comprising determining a speed of the cooling fan using the optical signal.

15. A cooling system for use in a cooking appliance of a type including a cooking enclosure and a cooling passage for venting heat generated within the cooking enclosure, the cooling system comprising:
    a cooling fan in fluid communication with the cooling passage to provide a directed airflow within the cooling passage,
    wherein the cooling fan includes a motor having a rotating motor shaft and a sensor disc configured to rotate with the motor shaft,
    wherein the sensor disc includes a plurality of circumferentially-arranged portions on a surface of the sensor disc having varying optical characteristics; and an optical sensor positioned to sense rotation of the cooling fan by sensing the plurality of circumferentially-arranged portions on the surface of the sensor disc.

* * * * *